Oct. 5, 1943.    J. ROBINSON    2,331,046
POWER TRANSMISSION
Filed Sept. 30, 1940    2 Sheets-Sheet 1

INVENTOR
JAMES ROBINSON
BY
*Ralph L. Tweedale*
ATTORNEY

Oct. 5, 1943.        J. ROBINSON         2,331,046
POWER TRANSMISSION
Filed Sept. 30, 1940        2 Sheets-Sheet 2
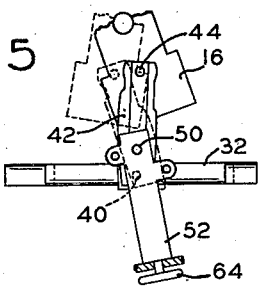
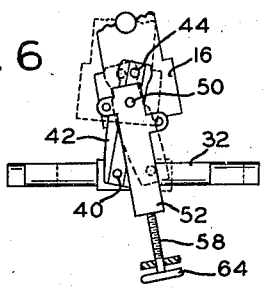
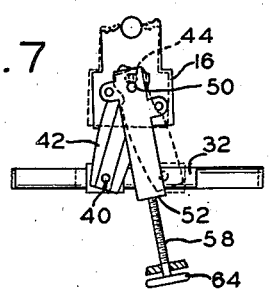
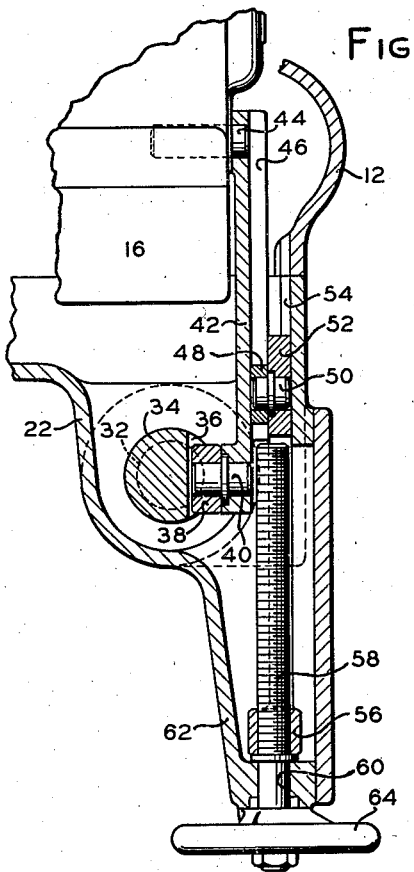
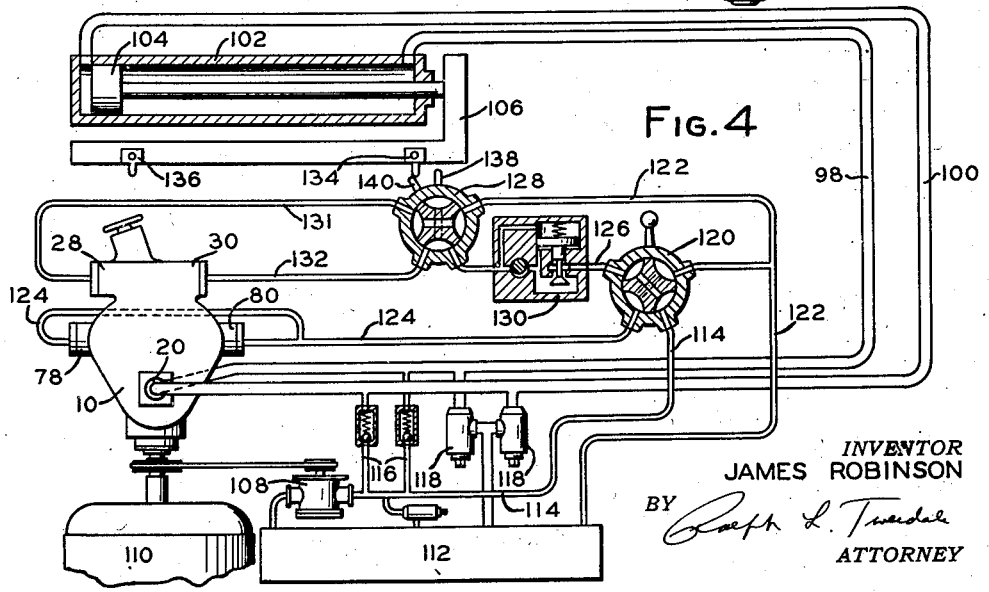
INVENTOR
JAMES ROBINSON
BY
ATTORNEY Patented Oct. 5, 1943

2,331,046

UNITED STATES PATENT OFFICE 2,331,046

POWER TRANSMISSION

James Robinson, Detroit, Mich., assignor to Vickers Incorporated, Detroit, Mich., a corporation of Michigan Application September 30, 1940, Serial No. 358,984

10 Claims. (Cl. 103—38)

This invention relates to power transmissions, particularly to those of the type comprising two or more fluid pressure energy translating devices, one of which may function as a pump and another as a fluid motor.

The invention is more particularly concerned with an improved power transmission system utilizing a variable displacement pump together with an improved control mechanism for the pump particularly adapted for use with hydraulic machine tool drives, for example, those used to operate shapers, planers, etc. Where a reversible variable stroke pump is used for driving a machine such as a planer, it is usually desirable to provide a rapid return stroke compared to the speed of the working stroke. In addition, it is necessary that a very wide range of working speeds be available for use with different classes of work.

The automatic pump reversing controls heretofore provided have been of such a character that the distance which the work table moves during the acceleration and deceleration period at the end of a stroke is a factor of the feed rate used; that is, at slow feed rate the distance the table moves during deceleration and acceleration of the slide in the opposite direction at one end of the stroke is a comparatively short distance since the control member which reverses the pump is required to move through only a very short stroke. On the other hand, when the table speeds are high, a correspondingly larger distance is required for decelerating and accelerating the slide.

It is an object of the present invention to provide an automatic reversing mechanism for a variable stroke pump wherein the distance which the work table travels during deceleration and acceleration is the same or substantially the same irrespective of the feed rate being used.

A further object is to provide a reversing pump control utilizing a servomotor for reversing the pump together with a means for varying the time required to reverse the pump.

A further object is to provide a control system of this character wherein the time of reversal and the maximum stroke setting of the pump may be simultaneously varied.

It is also an object to provide a reversing pump control mechanism, a servomotor for reversing the pump together with a variable ratio connection between the servomotor and the pump displacement controlling member.

Still another object of the invention is to provide a reversing pump control wherein the limits of maximum displacement both in a forward and in a reverse direction may be simultaneously controlled while maintaining a constant ratio between the maximum forward displacement and the maximum reverse displacement.

Further objects and advantages of the present invention will be apparent from the following description, reference being had to the accompanying drawings wherein a preferred form of the present invention is clearly shown.

In the drawings:

Figure 2 is a cross section on line 2—2 of Figure 1.

Figure 4 is a circuit diagram showing the application of the present invention to a complete hydraulic circuit for driving a reciprocating machine tool slide.

Figures 5, 6 and 7 are diagrams showing the range of movement of the control mechanism parts in various settings of the limit, stop and ratio varying mechanism.

Figure 1:
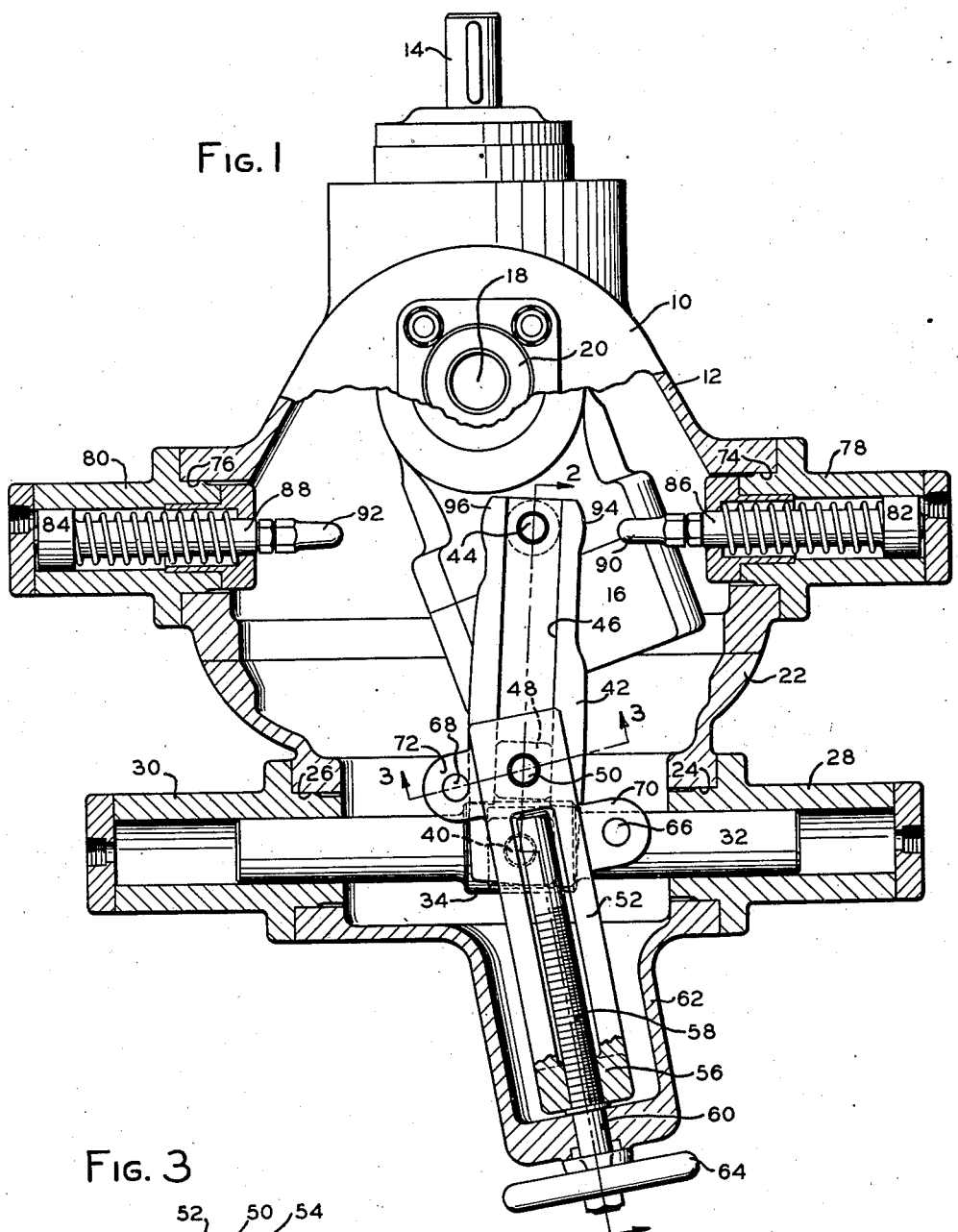
Figure 1 is a top view of a variable stroke pump and control mechanism partly in section showing a preferred embodiment of the present invention.
Figure 3:
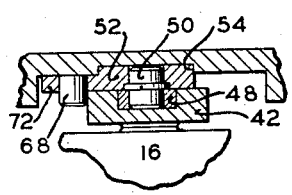
Figure 3 is a fragmentary cross section on line 3—3 of Figure 1.

Referring now to Figure 1, a reversible variable displacement pump 10 is illustrated and may be of the type shown in the patent to Thoma, 1,931,969, to which reference may be had for a detailed description of the internal mechanism of the pump. For the purpose of the present invention it is necessary only to state that the pump consists of a main housing 12 having a drive shaft 14 by which the internal parts of the pump are driven. A yoke 16 is mounted for oscillation on trunnions about an axis 18, and its angular position relative to the axis of shaft 14 determines the direction and rate of fluid delivery by the pump.

A delivery conduit projects from the top and a suction conduit from the bottom of the pump on the axis 18. Thus when the yoke is fully displaced to the right, as illustrated in Figure 1, oil will be delivered at maximum velocity through the upper pipe connection 20 and will be withdrawn through the lower connection. If the yoke be moved to a vertical position (Figure 1), the pump will rotate idly without delivering any fluid at all. When the yoke is swung to the left of neutral, the displacement will be progressively increased, but oil will be delivered in the opposite direction, that is, through the lower pipe connection, and the upper connection 20 then becomes the suction conduit.

Mounted on the lower end of the housing 12 in Figure 1 is a control housing 22 in which are formed two oppositely facing bores 24 and 26 carrying rigidly mounted therein a pair of servomotor cylinders 28 and 30. Reciprocable in these cylinders is a piston 32 having an enlarged central portion 34 provided with a transverse slot 36 (see Figure 2). Slidably mounted in the slot 36 is a square pivot block 38 carrying a pin 40 which is rigidly secured to one end of a lever 42. At its opposite end the lever 42 is pivoted through the yoke 16 by means of a pin 44 rigidly secured to the latter. Thus the lever 42 provides a connection between the pump controlling member 16 and the servomotor 32.

The fulcrum for the lever 42 is arranged to be shiftable in order to vary the ratio of travel between the piston 32 and the yoke 16. For this purpose the lever 42 is provided with a longitudinal slot 46 in its upper face. Slidable in the slot 46 is a fulcrum block 48 pivoted on a pin 50 rigidly secured to a slide 52. The slide 52 is mounted for movement in a slot 54 formed in the casing member 22 and in the main housing 12 (see Figure 2). The slide 52 is bifurcated, as illustrated, and provided with a cross member 56 at its lower end which is threaded to receive an adjusting screw 58. The latter is rotatably but non-slidably mounted in a bearing 60 formed in a cylindrical projection 62 of the casing member 22. At its lower end the adjusting screw 58 may carry a handwheel 64.

The axis of the screw 58 and of the groove 54 in which slide 52 travels is preferably arranged at a slight angle to the axis of shaft 14. This angle determines the ratio between the maximum forward and maximum reverse pump displacements which are produced at any setting of the device, in other words, to determine the ratio between feeding speed and rapid return.

The slide 52 also carries a pair of stop pins 66 and 68 which are rigidly mounted in ears 70 and 72 integrally formed with the slide 52 and projected from opposite sides thereof. The sides of the lever 42 are formed in a cam shape, as illustrated, for coaction with the pins 66 and 68 to act as limiting stops for determining the maximum displacement of the pump in forward and reverse directions at any given setting of the slide 52.

For the purpose of bringing the yoke 16 to neutral position the housing 12 is provided with two opposite bores 74 and 76 in which are mounted cylinders 78 and 80. The latter carry pistons 82 and 84 which are spring biased in an outward direction. The rods 86 and 88 of the pistons are provided with adjustable acorn nuts 90 and 92 which coact with cylindrical portions 94 and 96 formed on the upper end of lever 42. It will be seen that, whenever pressure oil is admitted simultaneously to both cylinders 78 and 80, the pistons will be projected inwardly, and the nuts 90 and 92 will center the yoke 16 in a neutral position if they are properly adjusted.

Referring now to Figure 4, a typical hydraulic circuit utilizing the pump and control mechanism above described is there illustrated. The conduit connections of the pump are connected by two main conduits 98 and 100 to the opposite ends of a work cylinder 102 having the usual reciprocating piston 104 for actuating a machine tool slide indicated diagrammatically at 106. A small auxiliary pump 108 of the fixed displacement type may be driven from the same electric motor 110 which drives the pump 10.

The pump 108 withdraws oil from a tank 112 and delivers it to an auxiliary supply line 114. Branches 116 may extend to the main conduits 98 and 100 and are provided with check valves to act as a replenishing or supercharging system for the main circuit. In addition, the main circuit may be provided with customary relief valves 118.

The auxiliary supply line 114 extends to the pressure port of a four-way pilot valve 120, the tank port of which is connected to tank by a conduit 122. One cylinder port of the valve 120 connects by a conduit 124 with the two cylinders 78 and 80. The other cylinder port of valve 120 connects by a conduit 126 with the pressure port of a second four-way pilot valve 128. A conventional flow-rate controlling valve 130 may be incorporated in the conduit 126 to maintain a constant rate of flow therethrough independently of resisting pressure. The tank port of valve 128 is connected to tank by conduit 122, while the cylinder ports thereof are connected by conduits 131 and 132 with the cylinders 28 and 30.

The valve 128 may be tripped by the usual adjustable tripping dogs 134 and 136 carried by the slide 106. The trip dogs 134 and 136 move in planes which are slightly spaced from one another with regard to the plane of the paper and coact with two correspondingly spaced operating levers 138 and 140 at the valve 128.

In operation, with motor 110 running and with the parts in the position illustrated in Figure 4, it will be seen that the dog 134 has just tripped the lever 140 as the slide 106 reached the lefthand limit of its movement so that pressure oil from auxiliary pump 108 is directed through conduits 114, 126 and 132 to the cylinder 30. The piston 32 will accordingly be shifted from the position shown in Figure 1 to its righthand position, and in so doing, the lower end of lever 42 will be carried to the right or the upper end will be carried to the left, the lever pivoting on fulcrum 50. As the cam surface on the right side of lever 42 contacts the pin 66, the yoke 16 will be prevented from further movement, and, by the time it reaches this position, will lie on the left side of neutral at one-half the angle of neutral that it started from. The delivery will acordingly be reversed at pump 10 which now withdraws oil from conduit 98 and delivers it into conduit 100, thus projecting piston 104 and slide 106 to the right on a working stroke at reduced speed.

When the dog 136 contacts lever 138, valve 128 will be shifted to direct pressure oil now through conduit 131 to cylinder 28 projecting the piston 32 back to the left. This carries the pump yoke back to its righthand position as shown in Figure 1, redirecting the main circuit oil through conduit 98 and retracting piston 104 at an increased speed.

The above explanation is based on an adjustment of the screw 58 such as that shown in Figures 1 and 2 wherein the pump yoke travels throughout the widest arc in reversing from forward to reverse and back. The arcs of movement of the various parts under these conditions are illustrated in Figure 5 from which it will be seen that the piston 32 has a small stroke under these conditions whereas the yoke 16 has a large stroke.

If the screw 58 be operated to move the fulcrum block 48 upwardly substantially half its travel, the arcs of movement of the various parts will be as illustrated in Figure 6. It will be seen from this figure that the travel of piston 32 has been increased while the travel of yoke 16 has been decreased. Two factors are involved in this change: First, the ratio of mechanical advantage between piston 32 and yoke 16 has been changed. Secondly, the limits of travel of yoke 16 have been decreased as determined by the shape of the cam sides of lever 42 and the new positions of the stop pins 66 and 68.

If it is desired to operate the slide 106 very slowly, the screw 58 may be turned to move the slide 52 all the way up to its extreme upper position, as illustrated in Figure 7. From this it will be seen that the stroke of piston 32 has been further increased while the stroke of yoke 16 has been reduced to a very small value. Here again the mechanical advantage of the servomotor has been increased while the range of travel of yoke 16 has been decreased.

The cams at the sides of lever 42 are preferably though not necessarily so shaped as to provide a relationship between the stroke range of yoke 16 and the ratio at lever 42 such that the former varies inversely with the latter as a hyperbolic function. Such a relationship provides for deceleration and acceleration of the slide 106 in the same distance for any setting of the slide 52. The distance G which any body moves in accelerating from zero velocity to a given velocity V in a given interval of time T is obtained with the following formula:

$$G = \frac{VT}{2}$$

It will be noted that the range of travel of yoke 16 determines the velocity of slide 106 so that Y (the range of yoke travel) can be substituted for the value V in the above formula. Likewise, the distance which piston 32 moves (at constant speed) is proportional to the time required to decelerate or accelerate the slide 106. Accordingly, P, the stroke of piston 32, may be substituted for T in the above formula which may now be written as follows:

$$G = \frac{YP}{2} \text{ or } YP = 2G$$

Since a constant value of G is the ultimate result desired, it is evident then that this can only be achieved by making the stroke of piston 32 and the stroke of yoke 16 such that their product is a constant at all settings of slide 52. Thus, by properly shaping the cammed sides of lever 42, this relationship may be obtained, and the slide 106 will then always decelerate in the same distance regardless of the velocity from which it starts decelerating.

While the form of embodiment of the invention as herein disclosed constitutes a preferred form, it is to be understood that other forms might be adopted, all coming within the scope of the claims which follow.

What is claimed is as follows:

1. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, a variable ratio connection between the servomotor and the shiftable member, variable limit stops for the shiftable member, and means for simultaneously varying the ratio of said connection and the setting of said stops.

2. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, a variable ratio connection between the servomotor and the shiftable member, variable limit stops for the shiftable member, and means for simultaneously varying the ratio of said connection and the setting of said stops, said servomotor operating at constant speed and variable stroke whereby the shiftable member is moved from its maximum displacement position, for any stop setting, to neutral while the pump delivers a substantially fixed volume of fluid.

3. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, a variable ratio connection between the servomotor and the shiftable member, and means for variably limiting the travel of said member and servomotor.

4. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, adjustable stops for limiting the travel of the shiftable member, and adjustable means for determining the time required for the servomotor to shift the member from one stop to the other.

5. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, adjustable stops for limiting the travel of the shiftable member, adjustable means for determining the time required for the servomotor to shift the member from one stop to the other, and means for simultaneously adjusting said stops and said means to provide an inverse relation between the travel of the member and the required time for such travel.

6. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, and means connecting the servomotor to the shiftable member adjustable for changing the ratio of servomotor travel to member travel.

7. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, and means including a lever connecting the servomotor to the shiftable member and a fulcrum for said lever adjustable for changing the ratio of servomotor travel to member travel.

8. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, means including a lever connecting the servomotor to the shiftable member and a fulcrum for said lever adjustable for changing the ratio of servomotor travel to member travel, and stop means associated with said fulcrum for variably limiting the travel of the member at different settings of said fulcrum.

9. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, means including a lever connecting the servomotor to the shiftable member and a fulcrum for said lever adjustable for changing the ratio of servomotor travel to member travel, stop means associated with said fulcrum, and cam means on said lever cooperating with the stop means for variably limiting the travel of the member at different settings of said fulcrum.

10. Control means for a variable displacement pump of the type adapted to drive an alternately reversing fluid motor comprising in combination, a member shiftable to varying distances on opposite sides of a neutral position to vary the rate and direction of fluid delivery, servomotor means for shifting said member, adjustable stops for limiting the travel of the shiftable member, adjustable means for determining the time required for the servomotor to shift the member from one stop to the other, and additional means for bringing the shiftable member to neutral position.

JAMES ROBINSON.